US008061437B2

(12) United States Patent
Liang

(10) Patent No.: US 8,061,437 B2
(45) Date of Patent: Nov. 22, 2011

(54) NAIL GUN WITH RAPIDLY ATTACHABLE AND DETACHABLE MAGAZINE ASSEMBLY

(75) Inventor: Chia-Sheng Liang, Taipei (TW)

(73) Assignee: De Poan Pneumatic Corp., New Taipei (TW)

( * ) Notice: Subject to any disclaimer, the term of this patent is extended or adjusted under 35 U.S.C. 154(b) by 49 days.

(21) Appl. No.: 12/717,197

(22) Filed: Mar. 4, 2010

(65) Prior Publication Data

US 2011/0215131 A1 Sep. 8, 2011

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***E21B 1/00*** | (2006.01) |

(52) U.S. Cl. ........................................ 173/120; 173/118

(58) Field of Classification Search .................. 173/120, 173/129, 118; 403/353, 360, DIG. 4, DIG. 14, 403/325, 330

See application file for complete search history.

(56) References Cited

U.S. PATENT DOCUMENTS

| | | | | |
|---|---|---|---|---|
| 4,597,517 | A * | 7/1986 | Wagdy | 227/8 |
| 5,579,975 | A * | 12/1996 | Moorman | 227/8 |
| 6,056,181 | A * | 5/2000 | Chuang | 227/8 |
| 6,431,428 | B1 * | 8/2002 | Chen | 227/120 |
| 6,679,414 | B2 * | 1/2004 | Rotharmel | 227/120 |
| 7,185,712 | B2 * | 3/2007 | Miller et al. | 173/1 |
| 7,328,826 | B2 * | 2/2008 | Shkolnikov | 227/8 |
| 7,527,106 | B2 * | 5/2009 | Miller et al. | 173/1 |
| 2008/0197166 | A1 * | 8/2008 | Schnell et al. | 227/130 |

* cited by examiner

*Primary Examiner* — Paul Durand
*Assistant Examiner* — Robert Long
(74) *Attorney, Agent, or Firm* — Roger H. Chu

(57) ABSTRACT

A nail gun with a rapidly attachable and detachable magazine assembly includes a nail gun, a magazine assembly and a quick joining mechanism. A handle portion of the nail gun has a quick joining pillar adapted to engage with the quick joining mechanism to attach the magazine assembly to the nail gun. By simply snap-fitting the quick joining pillar into a fixing element of the quick joining mechanism, the quick joining mechanism can naturally fix the quick joining pillar into the fixing element, and thus, the magazine assembly can be attached to the nail gun by simply a single action. Moreover, by pulling a pull rod of the quick joining mechanism and withdrawing the quick joining pillar from within the fixing element, the magazine assembly can be attached from the nail gun by also simply a single action.

14 Claims, 12 Drawing Sheets

NAIL GUN WITH RAPIDLY ATTACHABLE AND DETACHABLE MAGAZINE ASSEMBLY

BACKGROUND OF THE INVENTION

1. Technical Field

The present invention relates to nail guns, and more particularly, to a nail gun with a rapidly attachable and detachable magazine assembly, which is provided with a quick joining mechanism so that a user can rapidly assemble the magazine assembly to or detach the magazine assembly from the nail gun simply by a single action.

2. Description of Related Art

As a kind of tool indispensable to decoration workers, a nail gun has a magazine for accommodating a strip of nails. Conventionally, the magazine is mostly bolted to a handle portion of the nail gun, and a top portion of the magazine engages with a nosepiece of the nail gun to guide nails from the strip of nails into the nosepiece one by one so as to be further driven through the nosepiece. A conventional nail gun device disclosed in U.S. Pat. No. 6,431,429 is just representative of conventional nail gun devices. Referring to FIGS. 1A and 1B together, side views of a conventional nail gun device are illustrated therein. The conventional nail gun device 1*b* includes a nail gun 11*b*, a nosepiece 13*b* and a magazine 14*b*. A handle portion 12*b* of the nail gun 1*b* is provided thereon with a first joining mechanism 121*b*, which has a first joining rod 122*b* and a first joining hole 123*b*. The nosepiece 13*b* is provided with a second joining rod 131*b* thereon. The magazine 14*b* has a second joining mechanism 141*b* and a joining piece 142*b*. The second joining mechanism 141*b* is formed by a larger pressing plate 143*b* and a smaller pressing plate 144*b* in combination, and is pivoted to the magazine 14*b* so that the larger pressing plate 143*b* and the smaller pressing plate 144*b* can pivot upwards and downwards. Additionally, the magazine 14*b* further has, at a top portion thereof, a second joining hole 145*b* that can mate with the second joining rod 131*b*.

During use of the conventional nail gun device 1*b*, assembling the magazine 14*b* to and detaching the magazine 14*b* from the nail gun 11*b* are very troublesome. Specifically, when it is desired to assemble the nail gun 11*b* and the magazine 14*b* together, one must insert the second joining rod 131*b* into the second joining hole 145*b* at first, snap-fit the joining piece 142*b* into the first joining hole 123*b*, and then pull the larger pressing plate 143*b* downwards so that the larger pressing plate 143*b* and the first joining rod 122*b* are snap-fitted with each other to complete the assembling process. On the other hand, when it is desired to detach the magazine 14*b* from the nail gun 11*b*, one must press the smaller pressing plate 144*b* at first, then pull the larger pressing plate 143*b* to release it from being snap-fitted with the first joining rod 122*b*, and finally pull the magazine 14*b* downwards with a force so that the joining piece 142*b* is pulled out of the first joining hole 123*b* and the second joining rod 131*b* is pulled out of the second joining hole 145*b*.

Additionally, a device for rapid magazine detachment on a nail gun is disclosed in Taiwan Patent Application No. 096115283, an exploded view of which is illustrated in FIG. 2. The device for rapid magazine detachment on a nail gun is a combination of a nail gun 11' and a magazine 4'. The nail gun 11' has a handle portion 12', a nose piece 15' and a trigger 14'. The handle portion 12' is provided thereon with a pivot block 13', to which a rod 2' is pivoted. The rod 2' is formed with a tapered portion 21' at an end thereof, and an elastic element (not shown) is inserted over the rod 2' to drive the tapered portion 21' to abut against the pivot block 13'.

Furthermore, in the device for rapid magazine detachment on a nail gun, the magazine 4' is provided thereon with an engaging block 5', which has an end groove 51' and an embedding groove 52' in communication with each other. The tapered portion 21' of the rod 2' is adapted to be inserted into the end groove 51' and embedded into the bottom of the embedding groove 52'. A fastener 6', which has an outer stopper piece 61' and an inner stopper piece 62', is pivoted between the engaging block 5' and the magazine 4'. By swinging the fastener 6' into the bottom of the embedding groove 52', the tapered portion 21' of the rod 2' can be clamped by the outer stopper piece 61' and the inner stopper piece 62' cooperatively, with the outer stopper piece 61' being used to block between the embedding groove 52' and the end groove 51'. Thus, the tapered portion 21' is restricted within the embedding groove 52', thereby engaging the magazine 4' with the nail gun 1'. Additionally, when it is desired to detach the magazine 4' from the nail gun 11', one must swing the fastener 6' out of the bottom of the embedding groove 52' to detach the magazine 4'. Once the magazine 4' is detached, abnormal conditions of the nail gun 11' such as sticking of nails can be cleared.

Additionally, other relevant nail gun products have also been provided in the market, for example, a combined nail gun as disclosed in U.S. Pat. No. 6,609,646. Referring to FIGS. 3 and 4 together, a combined nail gun as well as a top view of a snap-fit element and a snap-fit mount thereof are illustrated therein respectively. The combined nail gun, which is a conventional product currently available in the market, is a combination of a nail gun 1*a* and a magazine 4*a*. The nail gun 1*a* has a handle portion 12*a*, a nose piece 15*a* and a trigger 14*a*. The handle portion 12*a* is provided thereon with a snap-fit mount 13*a*, which has a snap-fit rod 131*a* and a pull lever 132*a*. The magazine 4*a* is provided thereon with a snap-fit element 5*a*, which has an inserting hole 51*a* and a slot hole 52*a*. A user simply needs to insert the snap-fit rod 131*a* into the inserting hole 51*a*, push it into the slot hole 52*a* and then press the pull lever 132*a* downwards in order to engage the magazine 4*a* with the nail gun 1*a*. On the other hand, when it is desired to detach the magazine 4*a* from the nail gun 1*a*, the user simply needs to pull the pull lever 132*a* upwards and then move the snap-fit rod 131*a* out of the slot hole 52*a* and the inserting hole 51*a* sequentially, thereby detaching the magazine 4*a*.

The abovementioned nail guns all have the advantage of allowing the magazines to be attached to and detached from the nail guns without need of a tool. However, for the conventional nail gun device disclosed in U.S. Pat. No. 6,431,429, assembling the magazine 14*b* to and detaching the magazine 14*b* from the nail gun 11*b* represents a too complex procedure. For the device for rapid magazine detachment on a nail gun disclosed in Taiwan Patent Application No. 096115283, when the user swings the fastener 6' to detach the magazine 4', it is possible that the fastener 6' may be excessively stuck to the bottom of the embedding groove 52' so that the user must apply an extremely large force in order to swing the fastener 6' out, which is a prominent defect in design; moreover, swinging the fastener 6' back and forth frequently would cause abrasion of the fastener 6' and the engaging block 5' and, consequently, loose engagement of the fastener 6', thereby causing insecure engagement of the magazine 4' with the nail gun 11'. Finally, for the combined nail gun disclosed in U.S. Pat. No. 6,609,646, it accomplishes the purpose by snap-fitting the snap-fit rod 131*a* into the snap-fit element 5*a* and then pressing the pull lever 132*a* downwards to fix the snap-fit rod 131*a*, which design does not need a large force in attachment and detachment of the magazine 4*a*;

however, as a plastic piece, the pull lever 132*a* tends to lose the ability of fixing the snap-fit rod 131*a* due to abrasion after repeated attachment and detachment of the magazine 4*a*, in which case the pull lever 132*a* must be replaced in order to secure the engagement of the magazine 4*a* with the nail gun 1*a*.

Accordingly, in view of the drawbacks and shortcomings of the aforesaid conventional nail guns, the inventor of the present application has made great efforts to make inventive research thereon and eventually provided a nail gun with a rapidly attachable and detachable magazine assembly according to the present invention.

BRIEF SUMMARY OF THE INVENTION

The primary objective of the present invention is to provide a nail gun with a rapidly attachable and detachable magazine assembly, in which a quick joining mechanism is disposed on the magazine assembly so that a user can rapidly attach the magazine assembly to or detach the magazine assembly from the nail gun simply through a single action of snap-fitting a quick joining pillar of the nail gun into the quick joining mechanism and pulling a pull rod of the quick joining mechanism.

Accordingly, to achieve the abovementioned objective, the inventor proposes a nail gun with a rapidly attachable and detachable magazine assembly, which comprises a nail gun, a magazine assembly and a quick joining mechanism. The quick joining mechanism is disposed on the magazine assembly, and through engagement of the quick joining mechanism with the quick joining pillar of the nail gun, the magazine assembly can be attached to the nail gun. The quick joining mechanism comprises a fixing element, a pull rod, a fixing block, a snap-fit rod and a first elastic element. When it is desired to engage the magazine assembly with the nail gun, one simply needs to snap-fit the quick joining pillar into the fixing element. Then, the quick joining pillar will press an end of the snap-fit rod that is opposite to a snap-fit end downwards to drive the snap-fit rod to disengage from a pull-rod base of the pull rod, and consequently, the pull rod moves slightly towards a direction in which the quick joining pillar is snap-fitted. Meanwhile, a force is generated by the first elastic element to push a pull-rod spring supporting point of the pull rod so that the pull rod moves towards a direction opposite to the direction in which the quick joining pillar is snap-fitted. As a result, a pull-rod bevel of the pull rod makes contact with a pushing end of the fixing block and lifts the pushing end upwards to abut against the quick joining pillar. Thus, the quick joining pillar gets fixed into the fixing element to complete attachment of the magazine assembly to the nail gun body. On the other hand, when it is desired to detach the magazine assembly from the nail gun, one simply needs to pull the pull rod. Then, with movement of the pull rod, the pull-rod bevel disengages from the pushing end of the fixing block, making it impossible for the fixing block to abut against the quick joining pillar any longer. Thus, the quick joining pillar can be withdrawn from within the fixing element to allow for rapid detachment of the magazine assembly from the nail gun body. Additionally, a pull-rod side-end bevel is further disposed on the pull rod, and when it is desired to detach the magazine assembly from the nail gun and pull the pull rod, the pull-rod side-end bevel may further push a releasing end of the fixing block to move the pushing end of the fixing block downwards so that it is impossible for the pushing end to fix the fasting joining pillar any longer.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a nail gun with a rapidly attachable and detachable magazine assembly according to the present invention, an embodiment of the present invention will be described in detail with reference to the attached drawings hereinafter.

Figure 1A:
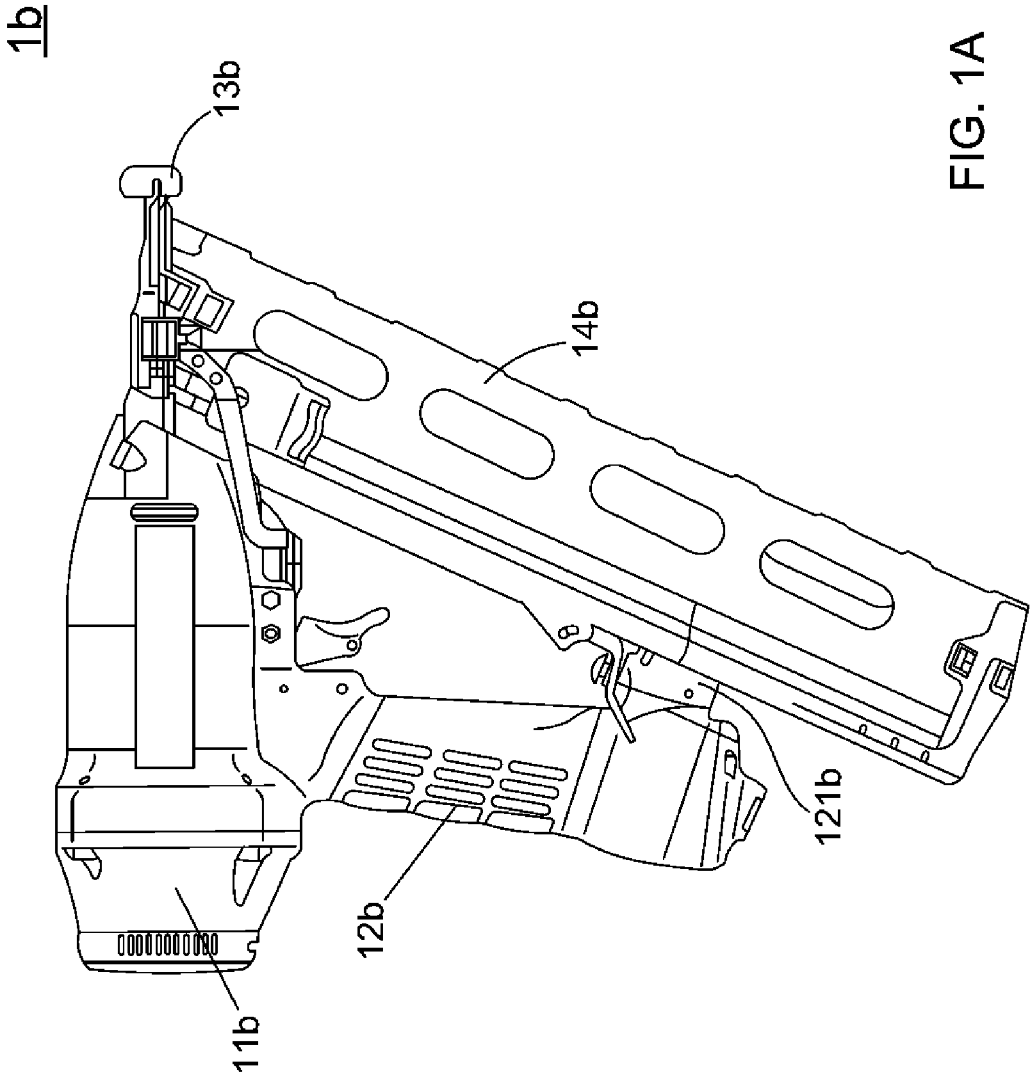
FIGS. 1A and 1B are side views of a conventional nail gun device.
Figure 1B:
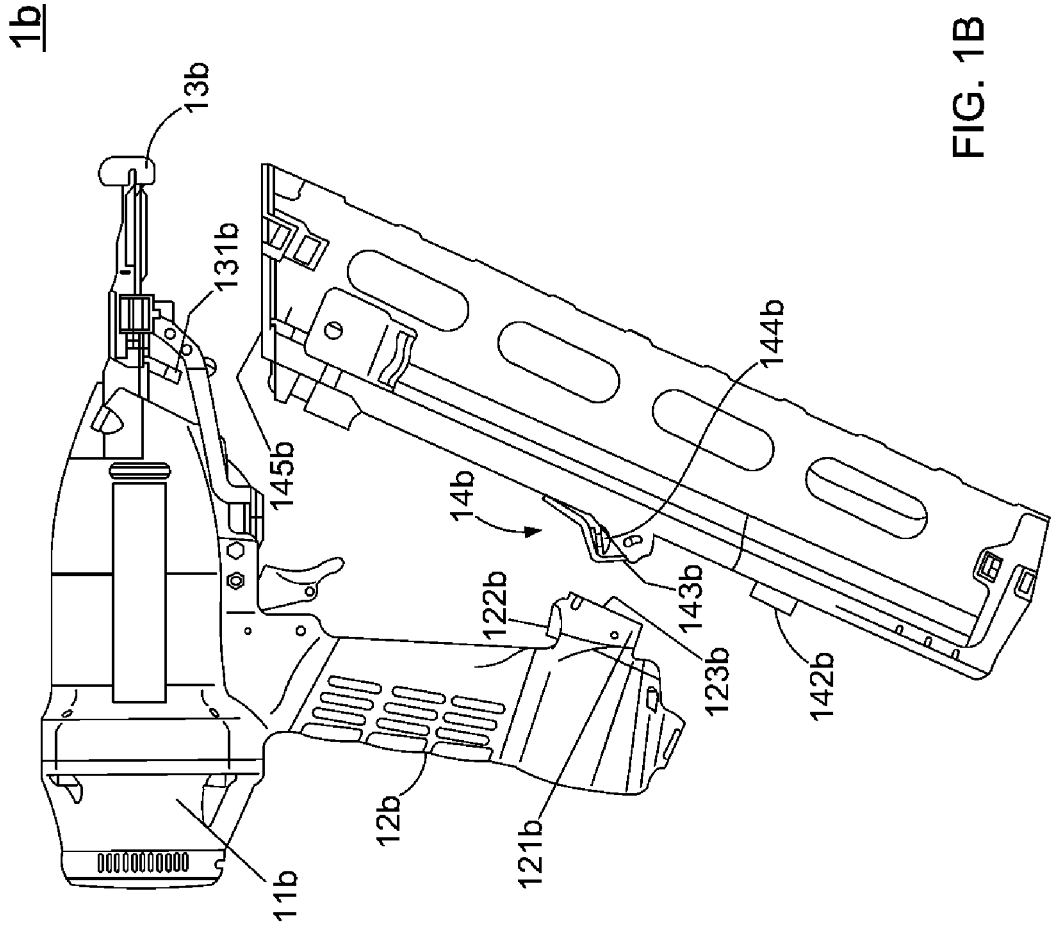
Figure 2:
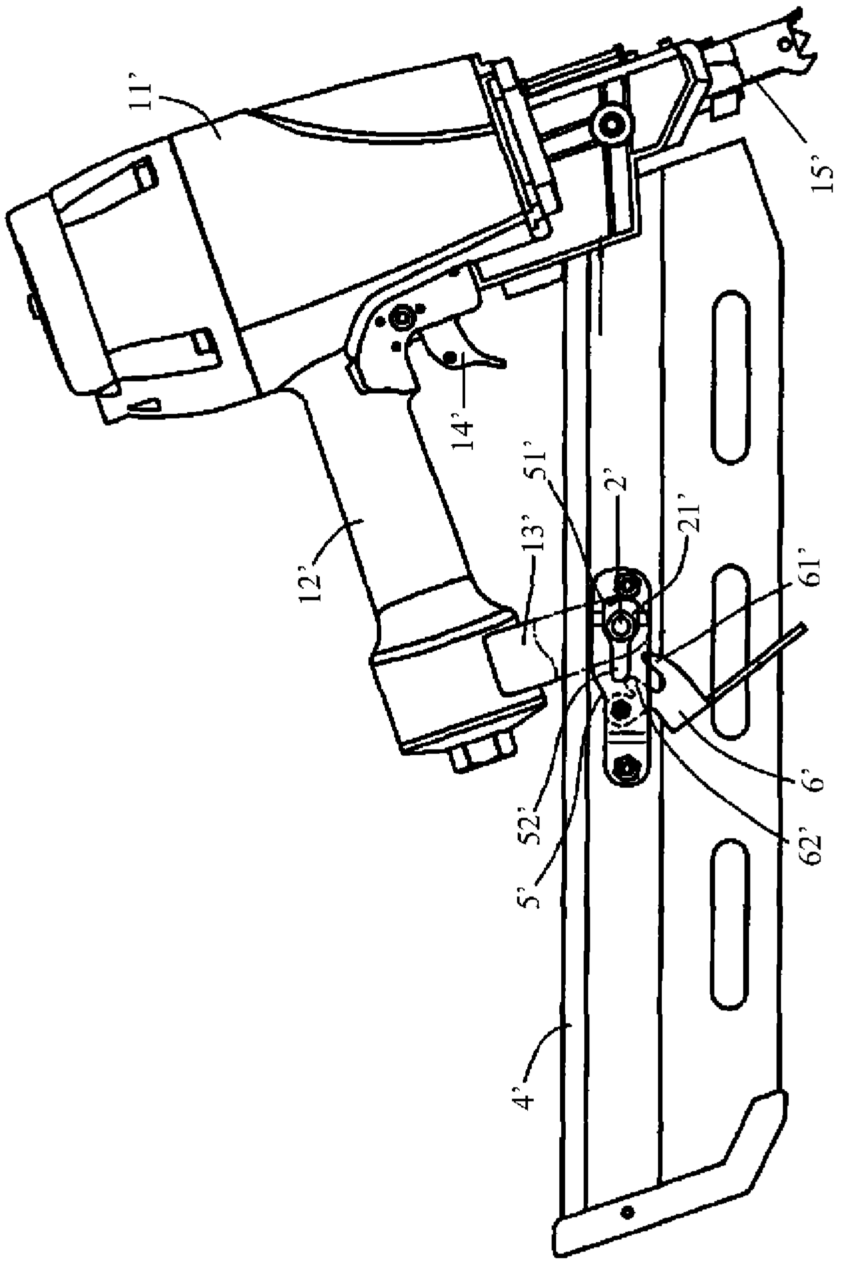
FIG. 2 is an exploded view of a device for rapid magazine detachment on a nail gun.
Figure 3:
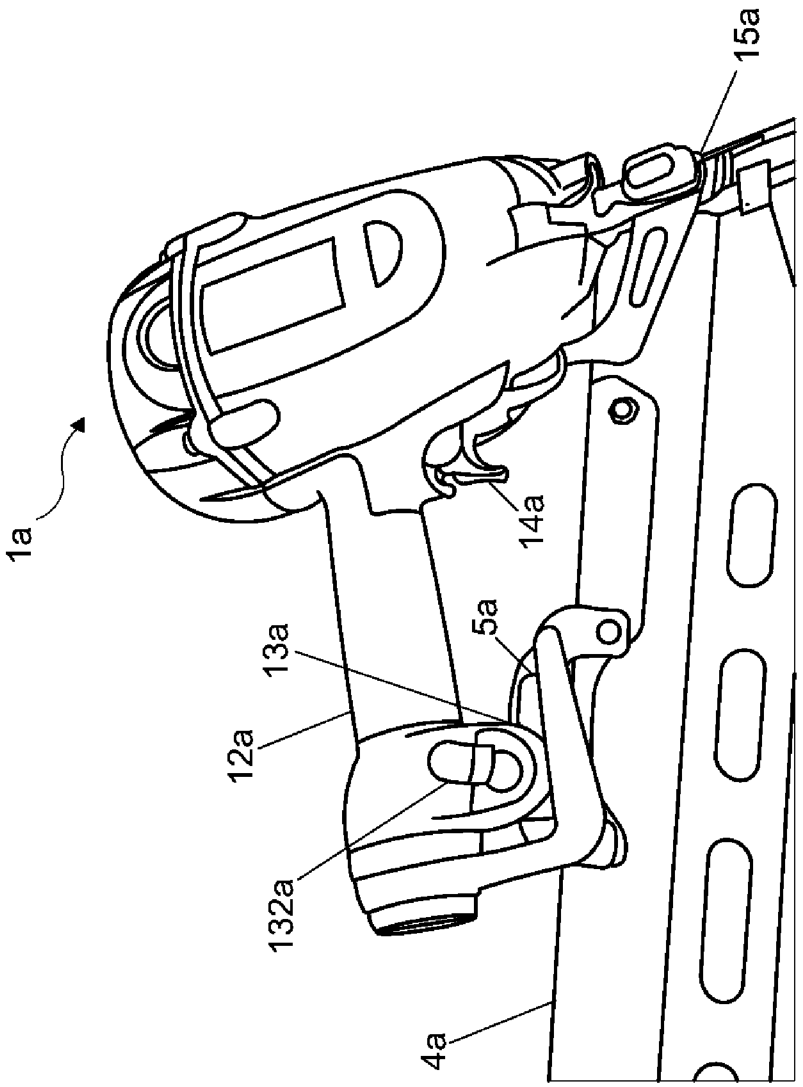
FIG. 3 is a view of a combined nail gun.
Figure 4:
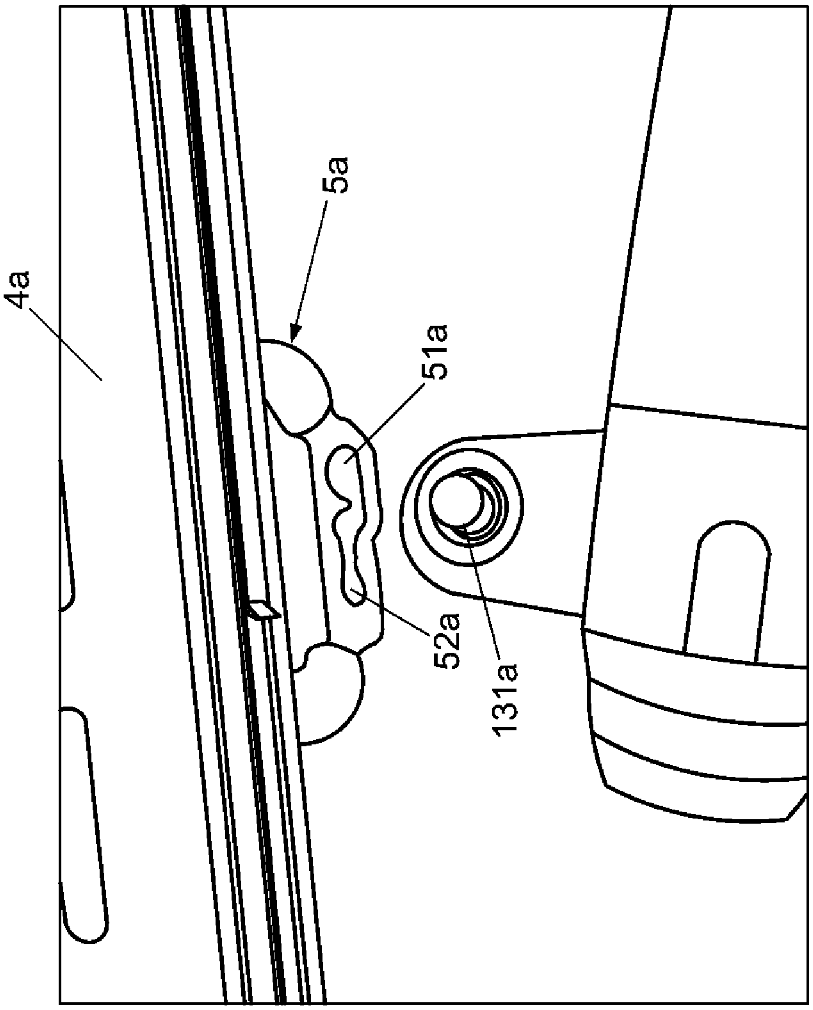
FIG. 4 is a top view of a snap-fit element and a snap-fit mount of the combined nail gun.
Figure 5:
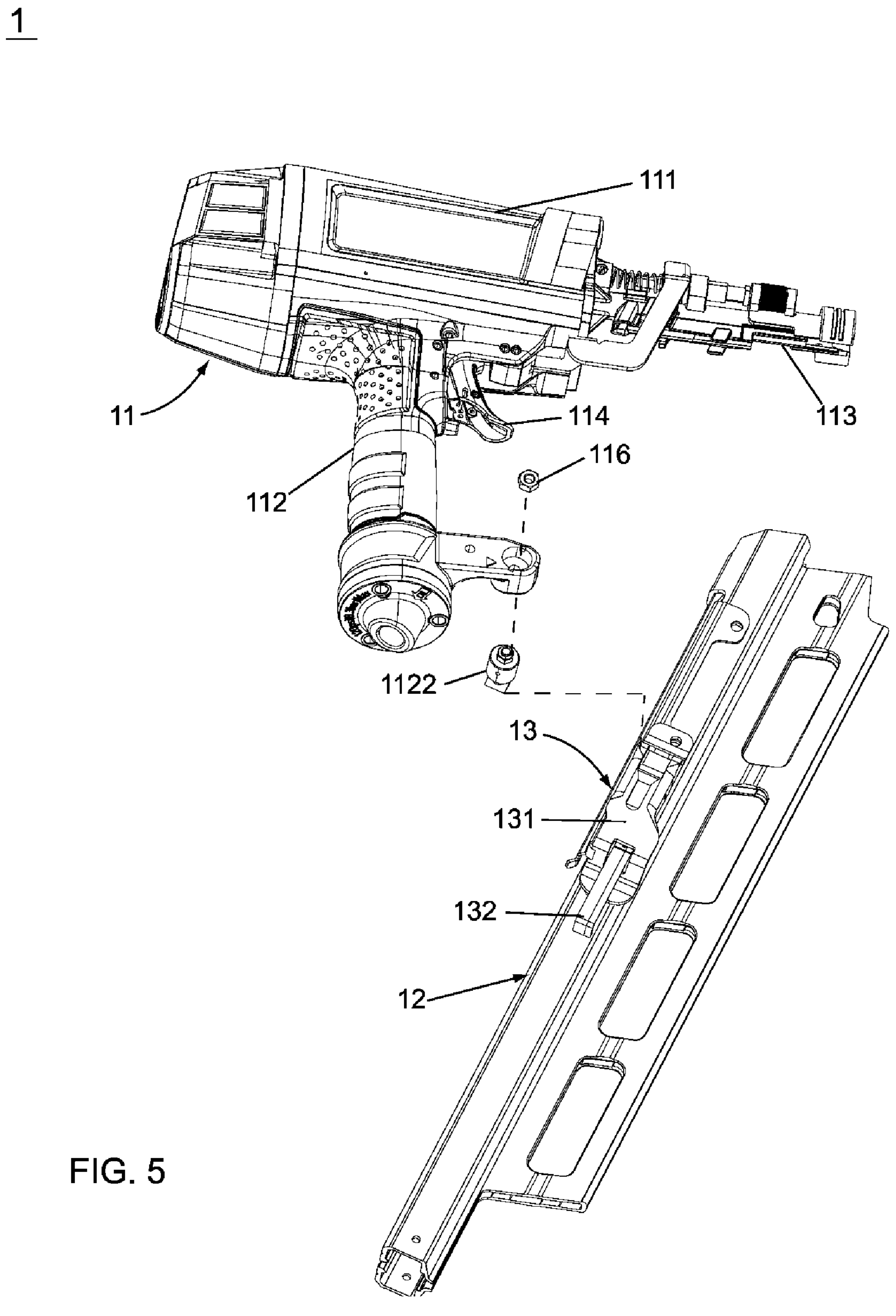
FIG. 5 is a partially exploded view of a nail gun with a rapidly attachable and detachable magazine assembly according to the present invention.
Figure 6:
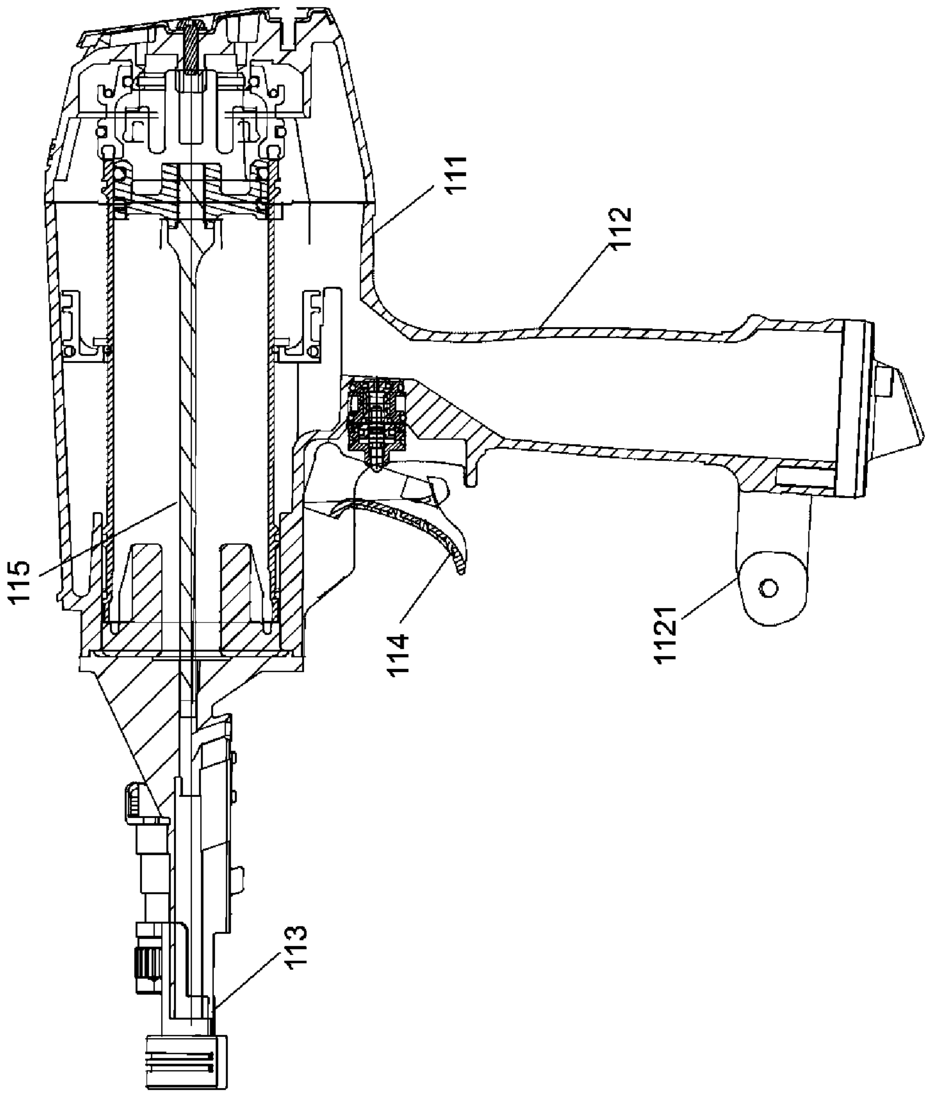
FIG. 6 is a cross-sectional view of the nail gun of the present invention.

Referring to FIGS. 5 and 6 together, FIG. 5 illustrates a partially exploded view and FIG. 6 illustrates a cross-sectional view of a nail gun with a rapidly attachable and detachable magazine assembly. The nail gun 1 includes a nail gun 11, a magazine assembly 12, which is adapted to connect with the nail gun 11 to supply the nail gun 11 with nails, and a quick joining mechanism 13, which is disposed on the magazine assembly 12 to assist in rapidly attaching the magazine assembly 12 to the nail gun 11. The nail gun 11 includes a gun body 111, a nosepiece 113, a nail driving element 115, a handle portion 112, a trigger 114 and a joining pillar nut 116. The nosepiece 113 is connected to the gun body 111 and adapted to accommodate the nails. The nail driving element 115 is disposed inside the gun body 111 and adapted to drive the nail accommodated in the nosepiece 113. The handle portion 112 is connected with the gun body 111 for holding, and is formed with a joining portion 1121 at a side of a distal end thereof. In this embodiment, by means of the joining pillar nut 116, a quick joining pillar 1122 is locked onto the joining portion 1121, and then by snap-fitting the quick joining pillar 1122 into the quick joining mechanism 13, the magazine assembly 12 can be easily attached to the nail gun 11. The trigger 114 is disposed between the gun body 111 and the handle portion 112, and by pressing the trigger 114, the nail driving element 115 can be triggered to propel the nail accommodated in the nosepiece 113.

Figure 7:
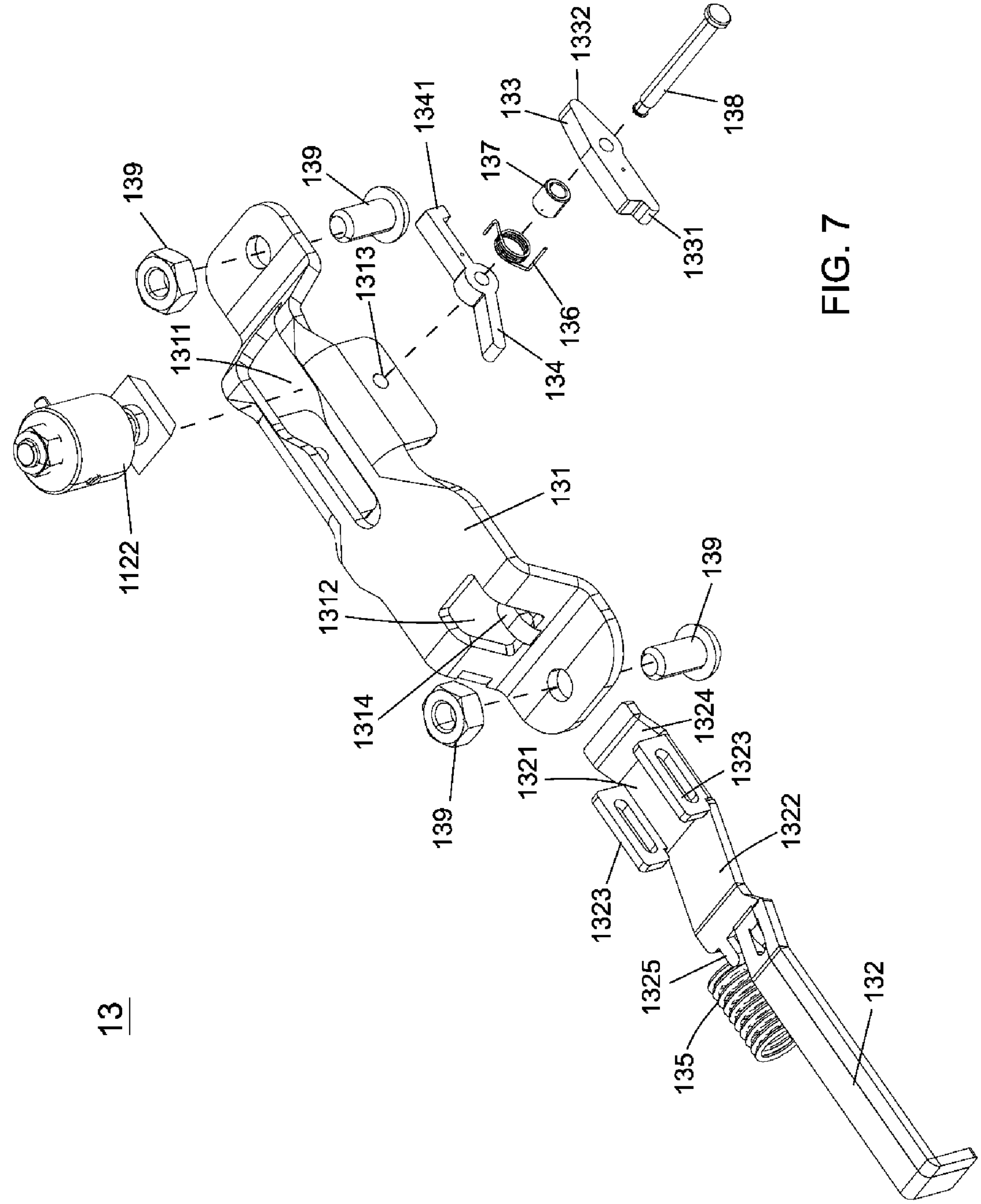
FIG. 7 is an exploded perspective view of a quick joining mechanism of the nail gun of the present invention.

Continuously referring to FIG. 5, please also refer to FIG. 7 which illustrates an exploded perspective view of the quick joining mechanism. The quick joining mechanism 13 is disposed on the magazine assembly 12, and includes a fixing element 131, a pull rod 132, a fixing block 133, a snap-fit rod 134, a first elastic element 135, a second elastic element 136, a sleeve 137, a dowel-pin 138 and two screw-and-nut assemblies 139. The fixing element 131 is locked onto the magazine assembly 12. The fixing element 131 has a fixing-element spring supporting point 1314 disposed therein, and further has a slot hole 1311, a side hole 1312 and two pin holes 1313. The slot hole 1311 is disposed at a top portion of the fixing element 131 in order for the quick joining pillar 1122 to be snap-fitted into the fixing element 131 through the slot hole 1311; and the side hole 1312 and the two pin holes 1313 are disposed at side edges of the fixing element 131 that are perpendicular to each other. The pull rod 132 is disposed inside the fixing element 131, wherein one end of the pull rod 132 extends through the side hole 1312 to a side of the fixing element 131 for a user to pull, and the other end of the pull rod 132 has a pull-rod base 1321, a pull-rod bevel 1322 and a pull-rod side-end bevel 1324. At a proximal end of the pull-rod bevel 1322 is disposed a pull-rod spring supporting point 1325, and at two sides of the pull-rod base 1321 that are parallel to the pull rod 132 are further disposed two pin frames 1323. The fixing block 133, one end of which is a pushing end 1331 and the other end of which is a releasing end 1332, is disposed above the pull-rod base 1321. Through cooperation of the pushing end 1331 of the fixing block 133 and the pull-rod bevel 1322 with each other, the quick joining pillar 1122 can be fixed into the fixing element 131.

Referring also to FIGS. 5 and 7, among the components of the quick joining mechanism 13, the snap-fit rod 134 is disposed above the pull-rod base 1321 in parallel with the fixing block 133. The snap-fit rod 134 has a snap-fit end 1341, and initially, the snap-fit rod 134 is snap-fitted to the pull-rod base 1321 by means of the snap-fit end 1341 to fix the pull rod 132 in place within the fixing element 131. The first elastic element 135 is a compression spring, which is disposed inside the fixing element 131 relative to the pull-rod base 1321. One end of the first elastic element 135 makes contact with the fixing-element spring supporting point 1314, while the other end thereof makes contact with the pull-rod spring supporting point 1325. When being snap-fitted into the fixing element 131, the quick joining pillar 1122 presses an end of the snap-fit rod 134 that is opposite to the snap-fit end 1341 downwards to drive the snap-fit end 1341 to move upwards and thus disengage from the pull-rod base 1321; meanwhile, in a direction opposite to the direction in which the quick joining pillar 1122 is snap-fitted, a force is generated by the first elastic element 135 to push the pull-rod spring supporting point 1325, so that the pushing end 1331 of the fixing block 133 makes contact with and, consequently, is lifted upwards by the pull-rod bevel 1322. As a result, the pushing end 1331 moves upwards to abut against the quick joining pillar 1122, causing the quick joining pillar 1122 to be fixed into the fixing element 131. Thus, the process of snap-fitting the quick joining pillar 1122 into the quick joining mechanism 13 is completed, thereby attaching the magazine assembly 12 to the nail gun 11.

Referring also to FIGS. 5 and 7 together, when it is desired to detach the magazine assembly 12 from the nail gun 11, one simply needs to pull the pull rod 132 towards a direction, which is the same as the direction in which the quick joining pillar 1122 is snap-fitted. Then, due to movement of the pull rod 132, the pull-rod bevel 1322 disengages from the pushing end 1331 of the fixing block 133 and, accordingly, the pushing end 1331 moves downwards and no longer abuts against the quick joining pillar 1122. Thus, the quick joining pillar 1122 can be withdrawn from within the fixing element 131 to detach the magazine assembly 12 from the nail gun 11. Furthermore, when it is desired to detach the magazine assembly 12 from the nail gun 11 and pull the pull rod 132, the pull-rod side-end bevel 1324 may further push the releasing end 1332 of the fixing block to move the pushing end 1331 of the fixing block downwards so that the pushing end 1331 no longer abuts against the quick joining pillar.

The second elastic element 136 described above is a torsion spring disposed between the fixing block 133 and the snap-fit rod 134. The second elastic element 136 is adapted to apply a torsion force to the snap-fit rod 134 so that the two ends of the snap-fit rod 134 can act like a teeterboard. Therefore, the snap-fit rod 134 is initially snap-fitted to the pull-rod base 1321 at the snap-fit end 1341 because of the torsion force, and when the quick joining pillar 1122 presses downwards the end of the snap-fit rod 134 that is opposite to the snap-fit end 1341, the snap-fit end 1341 will move upwards to disengage from the pull-rod base 1321. The sleeve 137 is disposed between the fixing block 133 and the snap-fit rod 134 and is adapted to be inserted into the second elastic element 136 to assist in fixation of the second elastic element 136. The dowel-pin 138 is adapted to be inserted into the two pin holes 1313, and when being inserted therein, the dowel-pin 138 is inserted through the snap-fit rod 134, the sleeve 137, the second elastic element 136, the fixing block 133 and the two pin frames 1323 to fix these components in combination into the fixing element 131 and above the pull-rod base 1321. Furthermore, inserting the dowel-pin 138 through the pin frames 1323 may also help to limit a movement distance of the pull rod 132. Finally, the two screw-and-nut assemblies 139 are adapted to lock the fixing element 131 onto the magazine assembly 12.

Figure 8A:
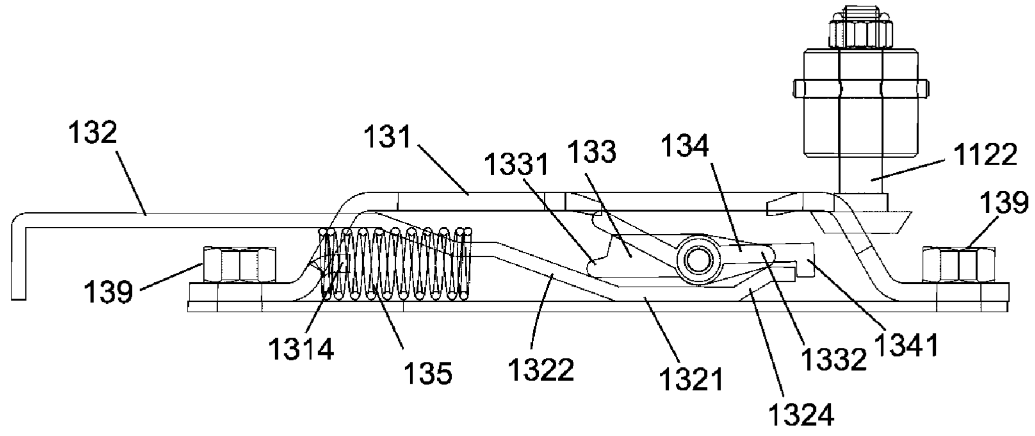
FIGS. 8A, 8B and 8C are views illustrating subdivided actions of snap-fitting a quick joining pillar into the quick joining mechanism.
Figure 8B:
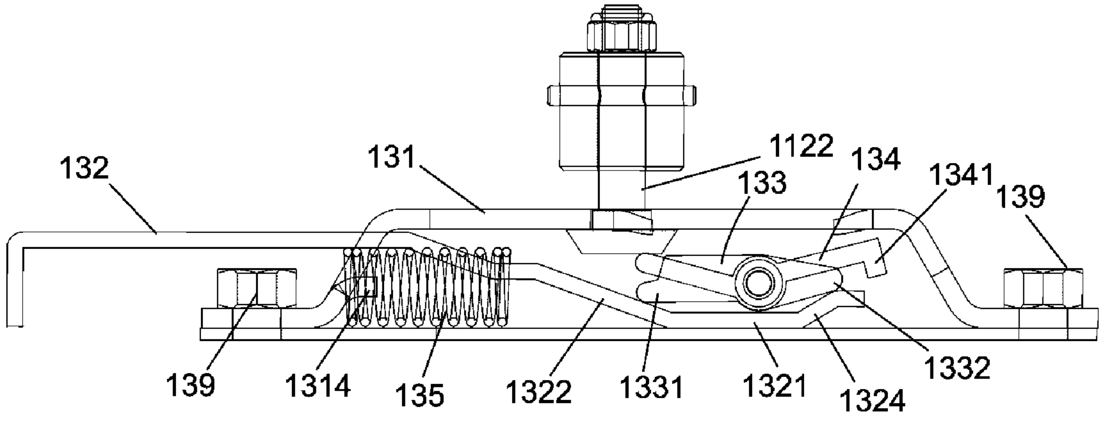
Figure 8C:
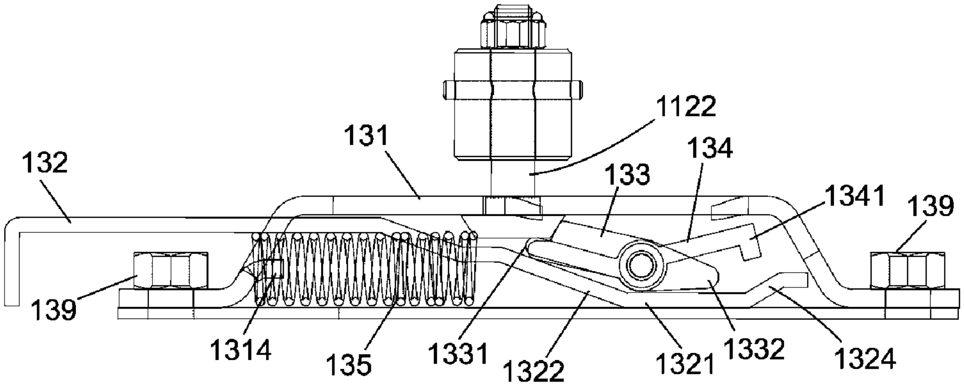

To more clearly illustrate how the quick joining pillar 1122 is rapidly snap-fitted into the quick joining mechanism 13, reference will now be made to FIGS. 8A through 8C, which are views illustrating subdivided actions of snap-fitting the quick joining pillar into the quick joining mechanism. When it is desired to attach the magazine assembly 12 to the nail gun 11, one simply needs to snap-fit the quick joining pillar 1122 into the fixing element 131, as shown in FIG. 8A. Then, as shown in FIG. 8B, the quick joining pillar 1122 presses downwards an end that is opposite to the snap-fit end 1341, causing the snap-fit end 1341 to move upwards to disengage from the pull-rod base 1321; consequently, the pull rod 132 moves towards the direction in which the quick joining pillar 1122 is snap-fitted. Meanwhile, as shown in FIG. 8C, a force is generated by the first elastic element 135 to push the pull-rod spring supporting point 1325 of the pull rod, causing the pull rod 132 to move towards a direction opposite to the direction in which the quick joining pillar 1122 is snap-fitted. Correspondingly, at this moment, the pushing end 1331 of the fixing block 133 makes contact with the pull-rod bevel 1322, and due to inclination of the pull-rod bevel 1322, the pushing end 1331 that makes contact with the pull-rod bevel 1322 will naturally be lifted upwards by the pull-rod bevel 1322 to move upwards and abut against the quick joining pillar 1122. Thus, the quick joining pillar 1122 is fixed into the fixing element 131, thereby completing the process of attaching the magazine assembly 12 to the nail gun 11.

Figure 9A:
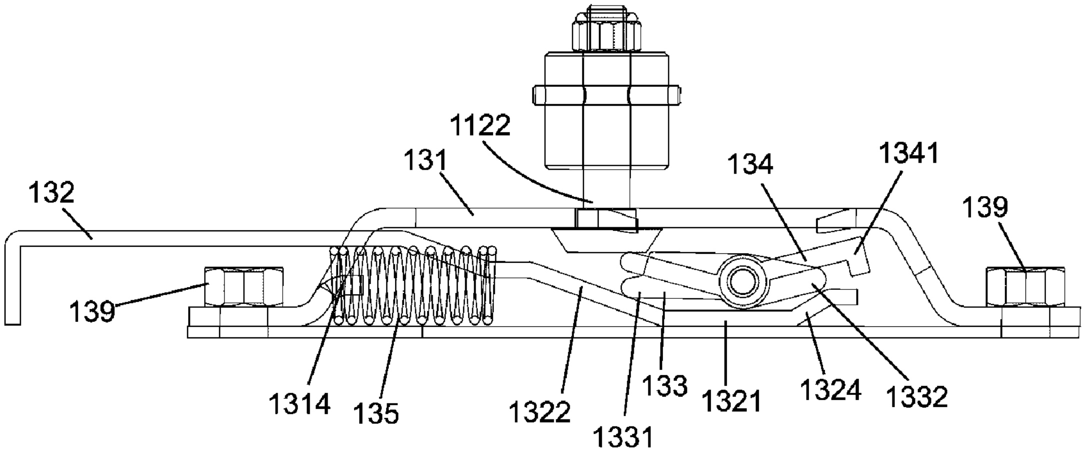
FIGS. 9A, 9B and 9C are views illustrating subdivided actions of dislodging the quick joining pillar from the quick joining mechanism.
Figure 9B:
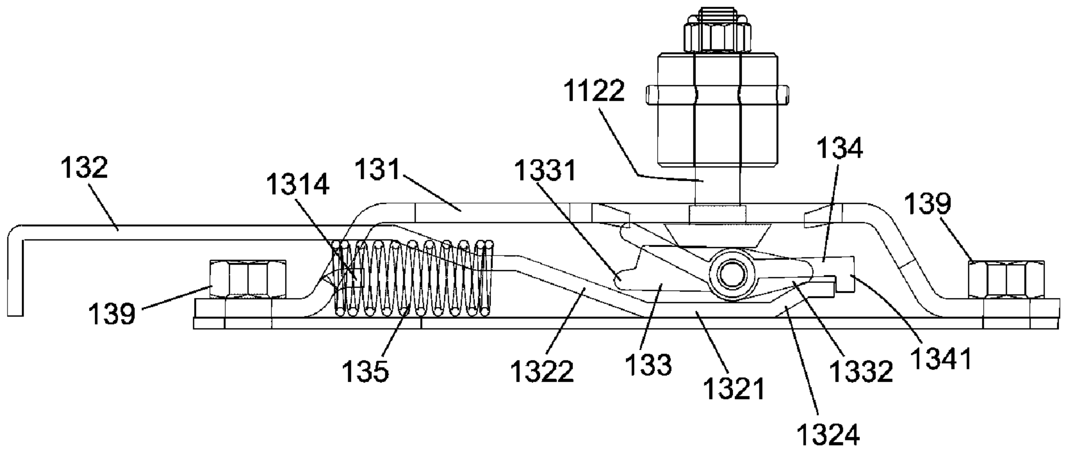
Figure 9C:
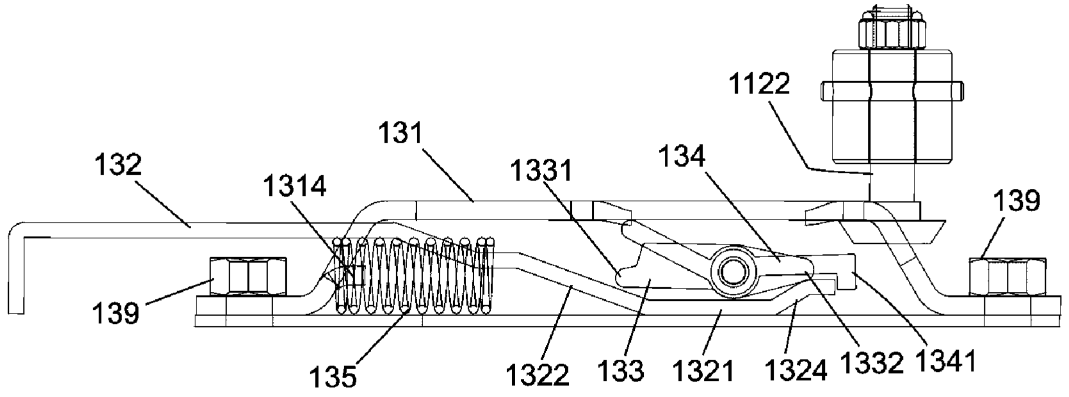

To more clearly illustrate how the quick joining pillar 1122 is rapidly withdrawn from the quick joining mechanism 13, reference will now be made to FIGS. 9A through 9C, which are views illustrating subdivided actions of withdrawing the quick joining pillar from the quick joining mechanism. When it is desired to detach the magazine assembly 12 from the nail gun 11, one simply needs to pull the pull rod 132 in the direction in which the quick joining pillar 1122 is snap-fitted into the fixing element 131, as shown in FIG. 9A. Then, as shown in FIG. 9B, the pull-rod bevel 1322 moves towards the direction in which the quick joining pillar 1122 is snap-fitted into the fixing element 131 and, consequently, disengages from the pushing end 1331 of the fixing block 133. As a result, the pushing end 1331 moves downwards and no longer abuts against the quick joining pillar 1122, making it possible for the quick joining pillar 1122 to be withdrawn from the slot hole 1311. While the quick joining pillar 1122 is withdrawn from the slot hole 1311, as shown in FIG. 9C, a force is generated by the first elastic element 135 to push the pull-rod spring supporting point 1325 of the pull rod 132, causing the pull rod 132 to move towards a direction opposite to the direction in which the quick joining pillar 1122 is snap-fitted into the fixing element 131; moreover, as the quick joining pillar 1122 has been withdrawn and no longer presses downwards the end of the snap-fit rod 134 that is opposite to the snap-fit end 1341, the torsion force applied by the second elastic element 136 to the snap-fit rod 134 will cause the snap-fit end 1341 to snap-fit with the pull-rod base 1321 of the pull rod 132, thereby fixing the pull rod 132 into the fixing element 131. Finally, after the quick joining pillar 1122 has been withdrawn completely from the fixing element 131, the magazine assembly 12 can be readily detached from the nail gun 11.

Figure 10:
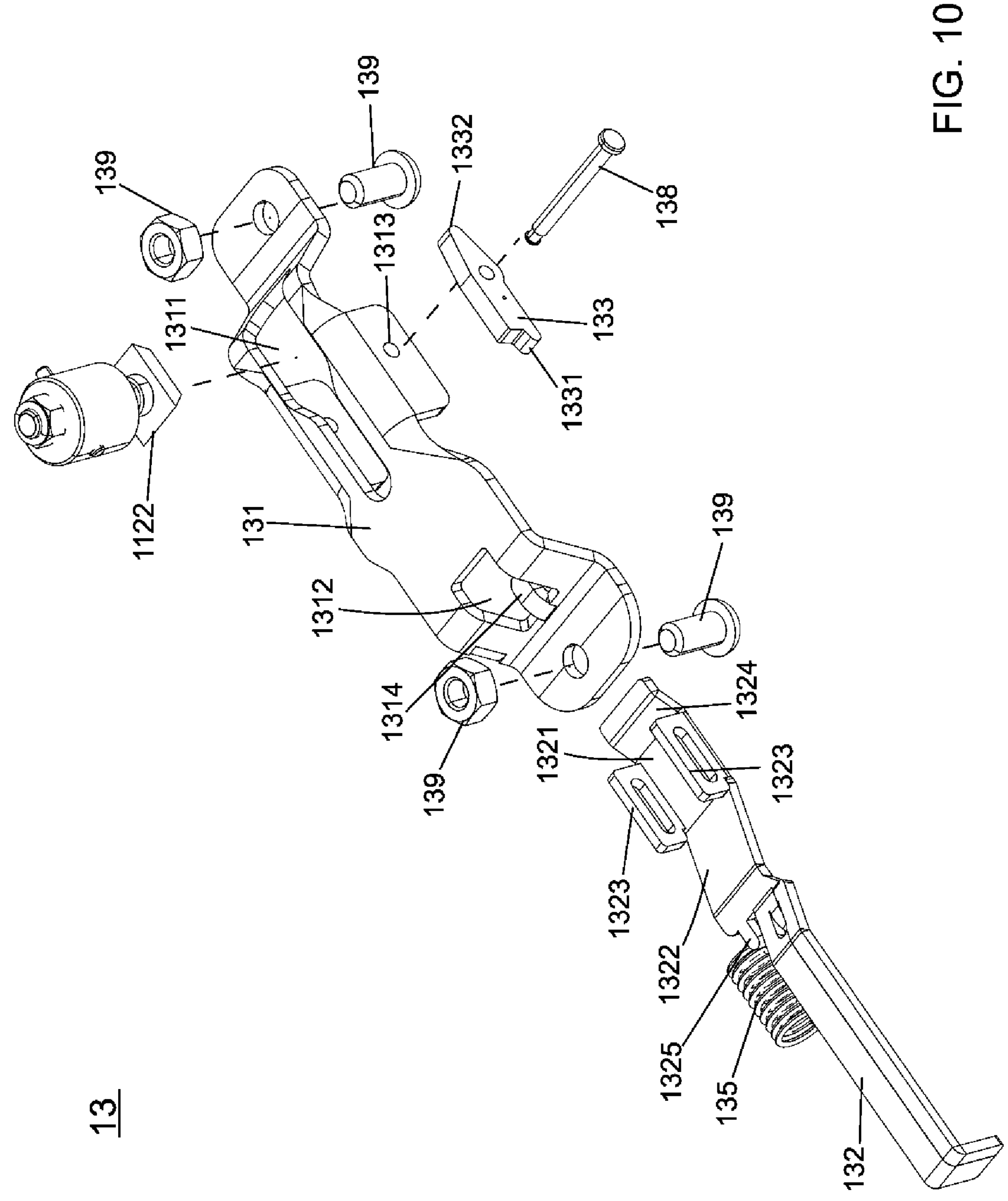
FIG. 10 is a second exploded perspective view of the quick joining mechanism.

Referring further to FIG. 10, a second exploded perspective view of the quick joining mechanism is shown therein. In fact, when the nail gun 1 according to the present invention is practiced, the quick joining mechanism 13 may dispense with the snap-fit rod 134, the second elastic element 136 and the sleeve 137, as shown in FIG. 10. However, before snap-fitting the quick joining pillar 1122 into the quick joining mechanism 13 that does not include the snap-fit rod 134, the second elastic element 136 and the sleeve 137, one must firstly pull the pull rod 132 slightly towards the direction in which the quick joining pillar 1122 is snap-fitted and then snap-fit the quick joining pillar 1122 into the fixing element 131. At this moment, in a direction opposite to the direction in which the quick joining pillar 1122 is snap-fitted into the fixing element 131, a force is generated by the first elastic element 135 to push the pull-rod spring supporting point 1325 of the pull rod 132, causing the pull rod 132 to move towards the direction opposite to the direction in which the quick joining pillar 1122 is snap-fitted. Correspondingly, the pushing end 1331 of the fixing block 133 makes contact with and, consequently, is lifted by the pull-rod bevel 1322 to move upwards and abut against the quick joining pillar 1122. Thus, the quick joining pillar 1122 is fixed into the fixing element 131. The way in which the quick joining pillar 1122 is withdrawn from the quick joining mechanism 13 that does not comprise the snap-fit rod 134, the second elastic element 136 and the sleeve 137 is just the same as what described above, and thus will not be further described herein.

It can be known from the above description that, when the present invention is practiced, the quick joining mechanism 13 may not include the snap-fit rod 134, the second elastic element 136 and the sleeve 137. Although this design requires an additional procedure of pulling the pull rod 132 at first when the quick joining pillar 1122 is to be snap-fitted into the quick joining mechanism 13, it may reduce the overall manufacturing cost of the nail gun 1 with the rapidly attachable and detachable magazine assembly. Therefore, this design can still be optionally adopted.

Thus, the nail gun according to the present invention has been disclosed above completely and clearly. In summary, the present invention has the following advantages: as the present invention has the quick joining mechanism disposed on the magazine assembly, the user can attach the magazine assembly to the nail gun by simply a single action of snap-fitting the quick joining pillar of the nail gun into the fixing element and can detach the magazine assembly from the nail gun by simply a single action of pulling the pull rod and withdrawing the quick joining pillar from within the quick joining mechanism. Hence, in case a nail gets stuck during use of the nail gun, the user can rapidly detach the magazine assembly from the nail gun to shoot the trouble.

I claim:

1. A nail gun with a rapidly attachable and detachable magazine assembly, comprising:

a nail gun comprising:

a gun body;

a nosepiece, being connected to the gun body and adapted to accommodate a nail;

a nail driving element, being disposed inside the gun body and adapted to drive the nail accommodated in the nosepiece;

a handle portion, being connected with the gun body for holding and formed with a joining portion at a side of a distal end thereof, wherein a quick joining pillar is disposed on the joining portion; and a trigger, being disposed between the gun body and the handle portion, wherein when the trigger is pressed, the nail driving element being triggered to force the nail accommodated in the nosepiece;

a magazine assembly, being adapted to connect with the nail gun to supply the nail gun with the nails; and a quick joining mechanism, being disposed on the magazine assembly so that, through engagement of the quick joining mechanism with the quick joining pillar, the magazine assembly is rapidly attached to the nail gun, the quick joining mechanism comprising:

a fixing element, being locked onto the magazine assembly and having a fixing-element spring supporting point disposed therein;

a pull rod, being disposed inside the fixing element, one end of the pull rod extending to a side of the fixing element for pulling, and an opposite end of the pull rod having a pull-rod base and a pull-rod bevel, wherein at a proximal end of the pull-rod bevel is disposed a pull-rod spring supporting point;

a fixing block, being disposed above the pull-rod base, one end of the fixing block being a pushing end and an opposite end of the fixing block being a releasing end, wherein through cooperation of the pushing end and the pull-rod bevel with each other, the quick joining pillar is fixed into the fixing element;

a snap-fit rod, being disposed above the pull-rod base in parallel with the fixing block and having a snap-fit end, wherein, initially, the snap-fit rod is snap-fitted to the pull-rod base by means of the snap-fit end to fix the pull rod in place within the fixing element; and a first elastic element, being disposed inside the fixing element relative to the pull-rod base and the pull-rod bevel, one end of the first elastic element making contact with the fixing-element spring supporting point while the other end of the first elastic element making contact with the pull-rod spring supporting point, wherein when being snap-fitted into the fixing element, the quick joining pillar presses an end of the snap-fit rod that is opposite to the snap-fit end downwards to drive the snap-fit end to move upwards and thus disengage from the pull-rod base; meanwhile, in a direction opposite to the direction in which the quick joining pillar is snap-fitted, a force being generated by the first elastic element and pushing the pull-rod spring supporting point, so that the pushing end of the fixing block makes contact with the pull-rod bevel, consequently, the fixing block being lifted upwards by the pull-rod bevel, and as a result, the pushing end moving upwards to abut against the quick joining pillar so as to cause the quick joining pillar to be fixed into the fixing element; when it is desired to detach the magazine assembly from the nail gun, one simply needs to pull the pull rod towards a direction, which is the same as the direction in which the quick joining pillar is snap-fitted, and then, due to movement of the pull rod, the pull-rod bevel disengaging from the pushing end of the fixing block and, accordingly, the pushing end moving downwards and no longer abutting against the quick joining pillar; so that the quick joining pillar can be withdrawn from within the fixing element to detach the magazine assembly from the nail gun.

2. The nail gun with the rapidly attachable and detachable magazine assembly of claim 1, wherein the pull rod further comprises a pull-rod side-end bevel disposed thereon, and when it is desired to detach the magazine assembly from the nail gun and the pull rod is pulled, the pull-rod side-end bevel further pushing the releasing end of the fixing block to move the pushing end of the fixing block downwards, so that the pushing end no longer abuts against the quick joining pillar.

3. The nail gun with the rapidly attachable and detachable magazine assembly of claim 1, wherein the nail gun further comprises a joining pillar nut adapted to lock the quick joining pillar onto the joining portion.

4. The nail gun with the rapidly attachable and detachable magazine assembly of claim 1, wherein the quick joining mechanism further comprises:

a second elastic element, being disposed between the fixing block and the snap-fit rod and adapted to apply a torsion force to the snap-fit rod so that the snap-fit end and the end opposite to the snap-fit end act like a teeterboard;

a sleeve, being disposed between the fixing block and the snap-fit rod and adapted to be inserted into the second elastic element to assist in fixation of the second elastic element;

a dowel-pin, being adapted to be inserted into the fixing element from one side of the fixing element, and, when being inserted into the fixing element, adapted to be sequentially inserted through the snap-fit rod, the sleeve, the second elastic element and the fixing block to fix these components in combination into the fixing element and above the pull-rod base; and at least a screw-and-nut assembly, being adapted to lock the fixing element onto the magazine assembly.

5. The nail gun with the rapidly attachable and detachable magazine assembly of claim 1, wherein the fixing element further comprises:

a slot hole, being disposed at a top portion of the fixing element and through which the quick joining pillar is snap-fitted into the fixing element;

a side hole, being disposed at a side of the fixing element and through which the pull rod extends to the outside of the fixing element for pulling; and two pin holes, being disposed at two sides of the fixing element respectively, wherein the direction of the two sides is perpendicular to the direction in which the pull rod extends, and the dowel-pin is adapted to be inserted through the two pin holes to be disposed onto the fixing element.

6. The nail gun with the rapidly attachable and detachable magazine assembly of claim 4, wherein at two sides of the pull-rod base that are parallel to the pull rod are disposed two pin frames so that when being inserted into the fixing element from one side of the fixing element, the dowel-pin being sequentially inserted through the snap-fit rod, the sleeve, the second elastic element, the fixing block and the two pin frames to fix the snap-fit rod, the sleeve, the second elastic element and the fixing block above the pull-rod base; and moreover, the pin frames also help to limit a movement distance of the pull rod to avoid that the pull rod might be excessively pulled outwards when being pulled.

7. The nail gun with the rapidly attachable and detachable magazine assembly of claim 4, wherein the first elastic element is a compression spring and the second elastic element is a torsion spring.

8. A nail gun with a rapidly attachable and detachable magazine assembly, comprising:

a nail gun comprising:

a gun body;

a nosepiece, being connected to the gun body and adapted to accommodate a nail;

a nail driving element, being disposed inside the gun body and adapted to drive the nail accommodated in the nosepiece;

a handle portion, being connected with the gun body for a user to hold and formed with a joining portion at a side of a distal end thereof, wherein a quick joining pillar is disposed on the joining portion; and a trigger, being disposed between the gun body and the handle portion, wherein when the trigger is pressed, the nail driving element being triggered to force the nail accommodated in the nosepiece;

a magazine assembly, being adapted to connect with the nail gun to supply the nail gun with the nails; and a quick joining mechanism, being disposed on the magazine assembly so that, through engagement of the quick joining mechanism with the quick joining pillar, the magazine assembly is rapidly attached to the nail gun, the quick joining mechanism comprising:

a fixing element, being locked onto the magazine assembly and having a fixing-element spring supporting point disposed therein;

a pull rod, being disposed inside the fixing element, one end of the pull rod extending to a side of the fixing element for pulling, and an opposite end of the pull rod having a pull-rod base and a pull-rod bevel, wherein at a proximal end of the pull-rod bevel is disposed a pull-rod spring supporting point;

a fixing block, being disposed above the pull-rod base, one end of the fixing block being a pushing end and an opposite end of the fixing block being a releasing end, wherein through cooperation of the pushing end and the pull-rod bevel with each other, the quick joining pillar is fixed into the fixing element; and a first elastic element, being installed inside the fixing element relative to the pull-rod base and the pull-rod bevel, one end of the first elastic element making contact with the fixing-element spring supporting point while an opposite end of the first elastic element making contact with the pull-rod spring supporting point, wherein when the quick joining pillar is snap-fitted into the fixing element, one must firstly pull the pull rod slightly towards the direction in which the quick joining pillar is snap-fitted into the fixing element, and at this moment, in a direction opposite to the direction in which the quick joining pillar is snap-fitted, a force being generated by the first elastic element and pushing the pull-rod spring supporting point, causing the pull rod to move towards the direction opposite to the direction in which the quick joining pillar is snap-fitted; correspondingly, the pushing end of the fixing block making contact with and, consequently, the fixing block being lifted by the pull-rod bevel to move upwards and abut against the quick joining pillar, and thus, the quick joining pillar being fixed into the fixing element; furthermore, when it is desired to detach the magazine assembly from the nail gun, one simply needs to pull the pull rod towards a direction, which is the same as the direction in which the quick joining pillar is snap-fitted, and then, due to movement of the pull rod, the pull-rod bevel disengaging from the pushing end of the fixing block and, accordingly, the pushing end moving downwards and no longer abutting against the quick joining pillar; thus, the quick joining pillar being withdrawn from within the fixing element to detach the magazine assembly from the nail gun.

9. The nail gun with the rapidly attachable and detachable magazine assembly of claim 8, wherein the pull rod further comprises a pull-rod side-end bevel disposed thereon, and when it is desired to detach the magazine assembly from the nail gun and the pull rod is pulled, the pull-rod side-end bevel further pushing the releasing end of the fixing block to move the pushing end of the fixing block downwards, so that the pushing end no longer abuts against the quick joining pillar.

10. The nail gun with the rapidly attachable and detachable magazine assembly of claim 8, wherein the nail gun further comprises a joining pillar nut adapted to lock the quick joining pillar onto the joining portion.

11. The nail gun with the rapidly attachable and detachable magazine assembly of claim 8, wherein the quick joining mechanism comprises:

a dowel-pin, being adapted to be inserted into the fixing element from one side of the fixing element, and, when being inserted into the fixing element, adapted to be inserted through the fixing block to fix the fixing block into the fixing element and above the pull-rod base; and at least a screw-and-nut assembly, being adapted to lock the fixing element onto the magazine assembly.

12. The nail gun with the rapidly attachable and detachable magazine assembly of claim 11, wherein the fixing element further comprising:

a slot hole, being disposed at a top portion of the fixing element and through which the quick joining pillar is snap-fitted into the fixing element;

a side hole, being disposed at a side of the fixing element and through which the pull rod extends to the outside of the fixing element for a user to pull; and two pin holes being disposed at two sides of the fixing element respectively, wherein the direction of the two sides is perpendicular to the direction in which the pull rod extends, and the dowel-pin is adapted to be inserted through the two pin holes to be disposed onto the fixing element.

13. The nail gun with the rapidly attachable and detachable magazine assembly of claim 11, wherein at two sides of the pull-rod base that are parallel to the pull rod are disposed two pin frames so that when being inserted into the fixing element from one side of the fixing element, the dowel-pin is inserted through the fixing block and the two pin frames to fix the fixing block above the pull-rod base; and moreover, the pin frames also help to limit a movement distance of the pull rod to avoid that the pull rod might be excessively pulled outwards when being pulled.

14. The nail gun with the rapidly attachable and detachable magazine assembly of claim 8, wherein the first elastic element is a compression spring.

* * * * *